(12) United States Patent  (10) Patent No.: US 8,154,533 B2
Jung et al.  (45) Date of Patent: Apr. 10, 2012

(54) LIQUID CRYSTAL DISPLAY DEVICE

(75) Inventors: Yong Chae Jung, Daegu-si (KR); Hoon Bae Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 724 days.

(21) Appl. No.: 12/292,687

(22) Filed: Nov. 24, 2008

(65) Prior Publication Data

US 2009/0289919 A1 Nov. 26, 2009

(30) Foreign Application Priority Data

May 21, 2008 (KR) ........................ 10-2008-0047140

(51) Int. Cl.
*G06F 3/041* (2006.01)
*G06F 3/045* (2006.01)
(52) U.S. Cl. .................. 345/175; 345/173; 345/104
(58) Field of Classification Search ................. None
See application file for complete search history.

(56) References Cited

U.S. PATENT DOCUMENTS

| 2003/0234759 | A1* | 12/2003 | Bergquist | 345/92 |
| 2005/0156820 | A1 | 7/2005 | Aoki | |
| 2007/0057628 | A1 | 3/2007 | Kim | |

FOREIGN PATENT DOCUMENTS

| CN | 1641733 | 7/2005 |
| CN | 1773335 A | 5/2006 |
| CN | 1933687 | 3/2007 |
| CN | 101109858 | 1/2008 |

OTHER PUBLICATIONS

Chinese Office Action dated Jul. 27, 2011 from counterpart Chinese patent application.

* cited by examiner

*Primary Examiner* — Muhammad N Edun
(74) *Attorney, Agent, or Firm* — Morgan, Lewis & Bockius LLP

(57) ABSTRACT

A liquid crystal display device is adapted to reduce cross-talk and signal noise so as to improve the perception ratio and accuracy of a sense element. The liquid crystal display device includes: a liquid crystal panel including a plurality of pixels connected to gate lines and data lines thereon, respectively; a gate drive circuit applying scan signals to the gate lines; a data drive circuit applying pixel voltage signals to the data lines; at least one sensor unit formed in at least one pixel region and sensing external lights and a touch of the liquid crystal panel; a switch unit switching a switch voltage and the pixel voltage signals to be applied to the data lines on the liquid crystal panel; a sense processor processing the sensed signal from the sensor unit; and a timing controller controlling the gate drive circuit, the data drive circuit, the switch unit, and the sense processor to be driven in one of data write mode and light sense mode.

13 Claims, 3 Drawing Sheets

LIQUID CRYSTAL DISPLAY DEVICE

CROSS-REFERENCE TO RELATED APPLICATION

This application claims priority under 35 U.S.C. 119 to Korean Patent Application No. 10-2008-0047140, filed on May 21, 2008, which is hereby incorporated by reference in its entirety.

BACKGROUND

1. Field of the Disclosure

This disclosure relates to a liquid crystal display device with a touch sense element, and particularly a liquid crystal display (LCD) device improving the perception ratio and accuracy of the sense element.

2. Description of the Related Art

Recently, a display field regarding the visual display of electric information signals is being developed as the substantial starting of an information age. In accordance therewith, various flat display devices with superior features such as thin profile, light weight, low power consumption, and similar features have been developed and rapidly (increasingly) replaced the previous cathode ray tube (or the Brown-tube).

Actually, these flat display devices include an LCD device, a plasma display panel (PDP) device, a field emission display (FED) device, and an electro luminescence (ELD) device, and so on. Also, these flat display devices commonly have a flat display panel, which consists of a pair of transparent isolation substrates bonded in opposition to each other at the center of a light emitting or polarizing material in order to screen pictures, as an indispensable factor (or element).

Among the flat display devices, the LCD device uses an electric field and controls the light transmissivity of the liquid crystal, thereby displaying a picture. To this end, the LCD device is configured to include a display panel with liquid crystal cells, a backlight unit irradiating lights to the display panel, and a drive circuit driving the backlight unit and the liquid crystal cells.

The display panel is configured to define a plurality of unit pixel regions by means of a plurality of gate lines and a plurality of data lines intersecting each other. More specifically, the display panel includes a thin film transistor array substrate and a color filter array substrate in opposition to each other, spaces positioned to maintain a constant cell gab between the substrates, and a liquid crystal filled in the cell gab.

The thin film transistor array substrate has a combination of the gate lines and the data lines, a thin film transistor formed in every intersection region of the gate line and the data line, pixel electrodes formed in the liquid crystal cell unit and connected to the thin film transistors, respectively, and an alignment film coated on the pixel electrodes. The gate lines and the data lines receive signals from the drive circuits through respective pad portions. The thin film transistors respond to scan signals on the gate lines and apply pixel voltage signals on the respective data lines to the respective pixel electrodes.

The color filter array substrate consists of color filters formed in a liquid crystal cell unit, a black matrix for defining the color filters and shielding lights from the exterior, and an alignment film coated on the filters and the black matrix.

These thin film transistor array substrate and color filter array substrate separately manufactured as described above, are completed through processes of a facing arrangement, a bonding, an injection of liquid crystal, and a sealing.

In such an LCD device including the aforementioned display panel, there have been attempts to form a light sensor inside the display panel in order to control the backlight unit in accordance with the brightness of an external light. Moreover, it has attempted to form a touch panel inside the display panel so as to reduce the size of the LCD device which had been enlarged by attaching the touch panel to the external of the display panel.

FIG. 1 is a circuit diagram showing a sense unit included in a related art LCD device, and FIG. 2 is a waveform diagram showing the waveforms of signals applied to the related art LCD device Referring to FIGS. 1 and 2, the sense unit loaded on the related art LCD device includes a sense element Tph sensing a touch with a liquid crystal panel, a sensor drive voltage line applying a drive voltage Vsto to the sense element Tph, a sensor bias voltage line applying a bias voltage Vbias to the sense element Tph, a capacitor Cst storing a signal sensed by the sense element Tph, a thin film transistor Tsw responding to a scan pulse (or a gate pulse) on a preceding gate line GLn−1 to output the sensed signal stored in the capacitor Cst, and a read-out line ROline applying the sensed signal from the thin film transistor Tsw to a sense processor (not shown).

The related art sense unit of the aforementioned configuration outputs the sensed signal stored in the capacitor Cst via the read-out line ROline, when a scan signal is applied to the preceding gate line GLn−1 during the interval which pixel voltage signals are applied to the data lines DL by a source output enable signal SOE changed into a second level voltage (or a low logic level). The pixel voltage signals and the sensed signal are affected by a parasitic capacitance existed between the read-out line ROline and the data line DL. Therefore, the sensed signal should include cross talk and noise.

Moreover, since the pixel voltage signals applied to the data lines DL have different levels from each other, the crosstalk and noise included in the sensed signal, which is being affected by the pixel voltage signal, should increase. As a result, the perception ratio and accuracy of the sense element are deteriorated.

BRIEF SUMMARY

Accordingly, the present embodiments are directed to an LCD device that substantially obviates one or more of problems due to the limitations and disadvantages of the related art.

An object of the present embodiment is to provide an LCD device that includes a sense unit with improved perception ratio and accuracy.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

A liquid crystal display device according to the present invention may be configured to include: a liquid crystal panel a liquid crystal panel including a plurality of pixels connected to gate lines and data lines thereon, respectively; a gate drive circuit applying scan signals to the gate lines; a data drive circuit applying pixel voltage signals to the data lines; at least one sensor unit formed in at least one pixel region and sensing lights external lights and a touch of the liquid crystal panel; a switch unit switching a switch voltage and the pixel voltage signals to be applied to the data lines on the liquid crystal panel; a sense processor processing the sensed signal from the sensor unit; and a timing controller controlling the gate drive circuit, the data drive circuit, the switch unit, and the sense processor to be driven in one of data write mode and light sense mode.

The sense unit includes: a sense element sensing the external lights and the touch of the liquid crystal panel; a read-out line transferring a signal sensed by the sense element to the sense processor; and a thin film transistor, responsive to a control signal, switching the sensed signal to be applied to the read-out line.

The control signal is derived from the scan pulse being applied to the gate line.

The sense unit further includes a storage capacitor storing the sensed signal to be applied from the sense element to the thin film transistor.

The read-out line is charged with the switch voltage.

The sense element uses a drive voltage having a level different from the switch voltage. The sense processor is configured to include a sampler sampling the signal on the read-out line upon the control of the timing controller.

The sense processor further includes an analog-to-digital converter converting the signal sampled by the sampler into a digital signal.

The sense processor further includes an amplifier the signal being applied from the read-out line to the sampler.

The amplifier differentially amplifies the signal on the read-out line with a reference voltage.

The switch unit supplies the data lines of the liquid crystal panel with the switch voltage equal to the reference voltage in the light sense mode.

The read-out line and the data line are simultaneously precharged with the switch voltage during the light sense mode.

The sense processor further includes: a capacitor connected between the read-out line and an output terminal of the amplifier; and a switch connected in parallel with the capacitor.

The switch is turned-off during the light sense mode.

The sense processor further includes an auxiliary sampler sampling a normal state signal of the read-out line from the output terminal of the amplifier, upon the control of the timing controller.

The normal state signal includes cross-talk and noise components caused by a parasitic capacitance between the read-out line and the data line.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Reference will now be made in detail to the embodiments of the present disclosure, examples of which are illustrated in the accompanying drawings. Wherever possible, the same reference numbers will be used throughout the drawings to refer to the same or like parts.

Figure 1:
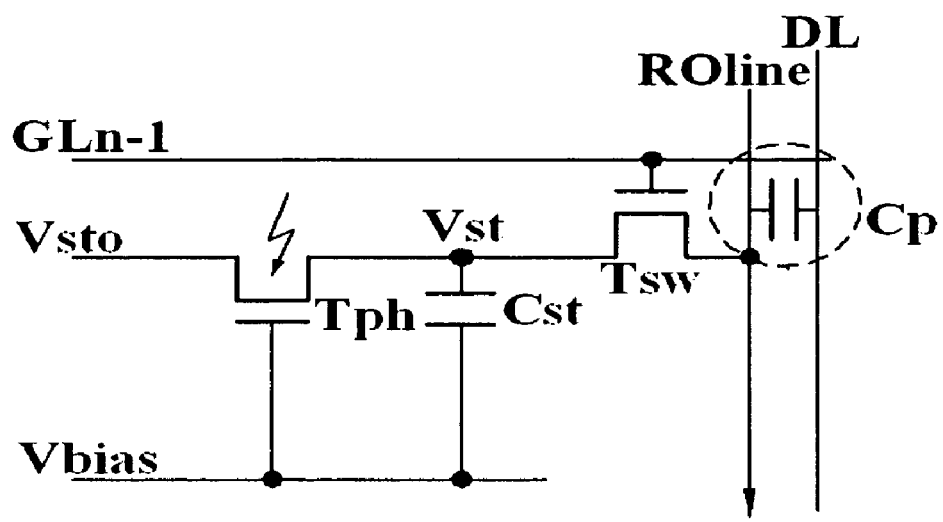
FIG. 1 is a circuit diagram view showing a sense unit mounted on an LCD device of the related art.
Figure 2:
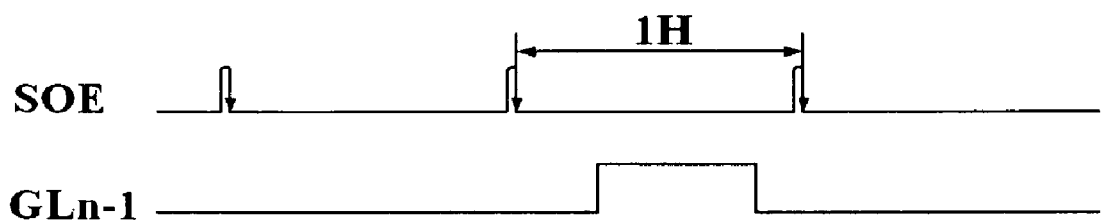
FIG. 2 is a waveform diagram showing signals applied to the LCD device of the related art.
Figure 3:
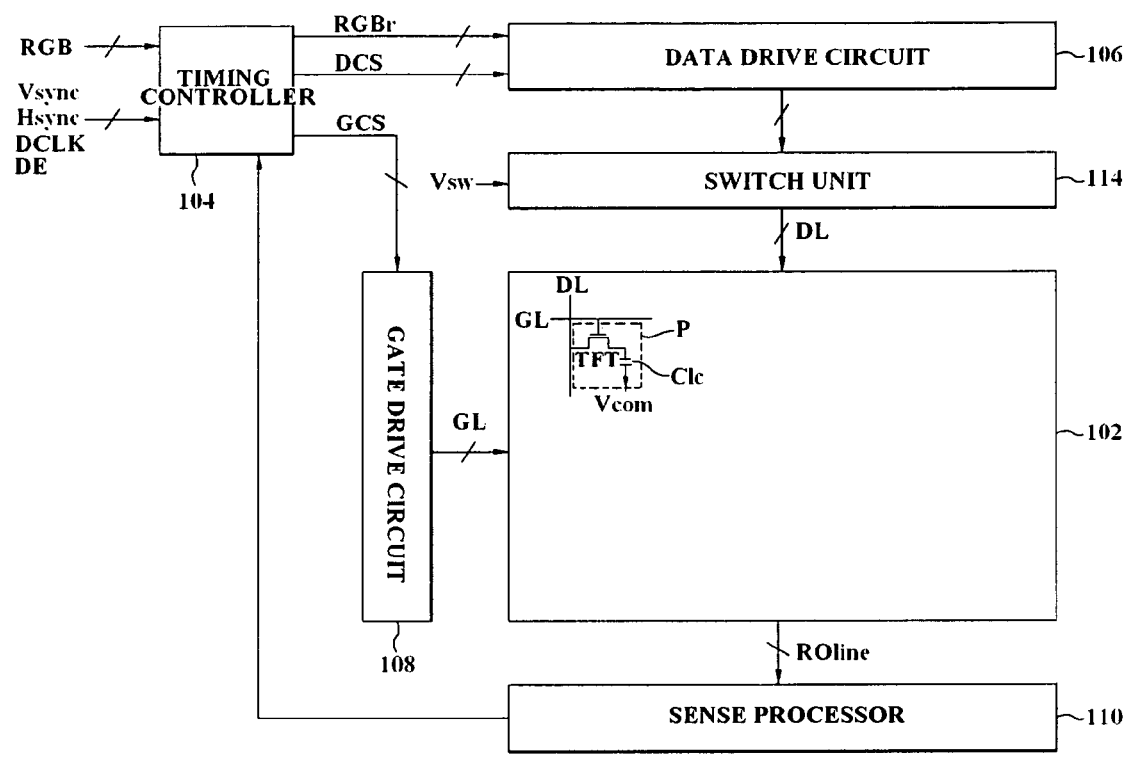
FIG. 3 is a schematic diagram showing an LCD device according to one general aspect of an embodiment.

FIG. 3 is a schematic diagram of an LCD device according to one general aspect of an embodiment. Referring to FIG. 3, the LCD device includes: a liquid crystal panel 102 defined into pixel regions P by plural gate lines GL and plural data lines DL intersecting each other; a gate drive circuit 108 applying scan pulses to the gate lines GL, respectively; and a data drive circuit 106 applying pixel voltage signals to the data lines DL, respectively. The LCD device further includes: a switch unit 114 switching a switch voltage and the pixel voltage signals to be applied to the data lines DL, at least one sense unit 112 formed in at least one pixel region P of the liquid crystal panel so as to sense lights incident from the exterior; a sense processor 110 processing a signal sensed by the sense unit 112; and a timing controller 104 configured to control the gate drive circuit 108, the data drive circuit 106, the switch unit 114 and the sense processor 110 to be driven in one of data write mode and light sense mode.

The liquid crystal panel 102 displays frames, which is each corresponding to one picture, in a first drive frequency (for example, in a vertical synchronous frequency). To this end, the liquid crystal panel 102 is configured to include a lower substrate and an upper substrate bonded in opposition to each other. Also, liquid crystal panel 102 includes a liquid crystal layer (not shown) and spacers (not shown) between the lower and upper substrates. The spacers provide a constant gap between the lower and upper substrates.

The lower substrate includes: the plural data lines DL and the plural gate lines GL formed to cross each other; thin film transistors TFT formed in the pixel regions P defined by the data lines DL and the gate lines GL crossing each other, respectively; and pixel electrodes of the liquid crystal cells Clc connected to the thin film transistors TFT, respectively. The thin film transistor TFT responds to the scan pulse (or the gate pulse) from the gate line GL and applies a pixel voltage signal from the data line DL to the liquid crystal cell Clc.

The liquid crystal cell Clc consists of a common electrode Vcom and a pixel electrode, connected to the thin film transistor TFT, which are in opposition to each other at the center of the liquid crystal layer. In accordance therewith, the liquid crystal cell Clc can be represented to be equal to a liquid crystal capacitor. Such a liquid crystal cell Clc further includes a storage capacitor for maintaining the pixel voltage signal charged in the liquid crystal capacitor until applying of a new pixel voltage signal.

The upper substrate is configured to include a black matrix separating color filters and defining the pixel regions (i.e., liquid crystal cells) and the common electrode Vcom receiving a common voltage. The color filters consist of at least three kind filters including a red filter, a blue, and a green filters. The common electrode Vcom on the upper substrate drives a vertical electric-field system of liquid crystal such as one of a twisted nematic mode or a vertical alignment mode. In another method, if a horizontal electric-field system of liquid crystal such as one of an In Plane Switching mode or a Fringe Field Switching mode is used for the liquid crystal panel 102, the common electrode Vcom is formed on the lower substrate together with the pixel electrodes. The liquid crystal panel 102 includes polarizing plates (or polarizers) with orthogonal light-axes attached to the outer surfaces of the upper and lower substrates, and alignment films formed in the inner surfaces of the upper and lower substrates adjacent to the liquid crystal so as to set a pre-tilt angle of the liquid crystal.

The gate drive circuit 108 responds to the gate control signals GCS applied from the timing controller 104 and generates scan pulses (i.e., gate pulses) to be sequentially supplied to the plural gate lines GL. Also, the gate drive circuit 108 receives a power supply voltage Vdd from a power supply unit (not shown) and derives a gate high voltage VGH and a gate low voltage VGL from the power supply voltage Vdd. The gate high voltage VGH and the gate low voltage VGL are used for the generation of the scan pulses.

To generate the scan pulses, the gate drive circuit 108 configured to include a shift register, a level shifter converting output signals of the shift register into signals which each has a swing width adaptive to drive the thin film transistor TFT of the liquid crystal cell Clc, and an output buffer connected between the level shifter and the gate lines GL. In order to sequentially output the scan pulses to the gate lines GL, the gate drive circuit 108 is mounted on a tape carrier package to be bonded to the liquid crystal panel 102 and connected to gate pads which are formed on the lower substrate of the liquid crystal panel 102. As an alternative method, the gate drive circuit 108 can be simultaneously and directly formed on the lower substrate of the liquid crystal panel 102 together with the plural data lines DL, the gate lines GL, and the thin film transistors TFT, which are included in a liquid crystal cell array, by using an Gate In Panel process. In still another method, the gate drive circuit 108 may be directly installed on the lower substrate of the liquid crystal panel 102 in a Chip-On Glass system.

The data drive circuit 106 responds to data control signal DCS applied from the timing controller 104, converts data signals RGBr supplied from the timing controller 104 into pixel voltage signals each having the shape of an analog signal, and applies the pixel voltage signals for one line to the data lines DL of the liquid crystal panel 102 every horizontal period when the scan pulse is applied to the gate line GL. In other words, the data drive circuit 106 selects gamma voltages having different levels in accordance with the gray scale level of each of the data signals RGBr and applies the selected gamma voltages to the data lines DL as the analog video signal of the pixel voltage signal. Moreover, the data drive circuit 106 can selectively invert the polarity of each pixel voltage signal to be applied to the data line DL, depending on a polarity control signal POL (not shown).

The timing controller 104 rearranges source data RGB from the exterior into the data signals RGBr to adequately drive the liquid crystal panel 102 and applies the rearranged data signals RGBr to the data drive circuit 106. Also, the timing controller 104 uses a main clock DCLK, a data enable signal DE, and horizontal and vertical synchronous signals Hsync and Vsync and generates the data control signals DCS and the gate control signals GCS, thereby controlling the data and gate drive circuits 106 and 108. The data control signals DCS include a source start pulse SSP, a source shift pulse SSC, a source output enable signal SOE, and so on. The gate control signals GCS includes a gate start pulse GSP, a gate output enable signal GOE, and at least one gate shift clock GSC.

Figure 5:
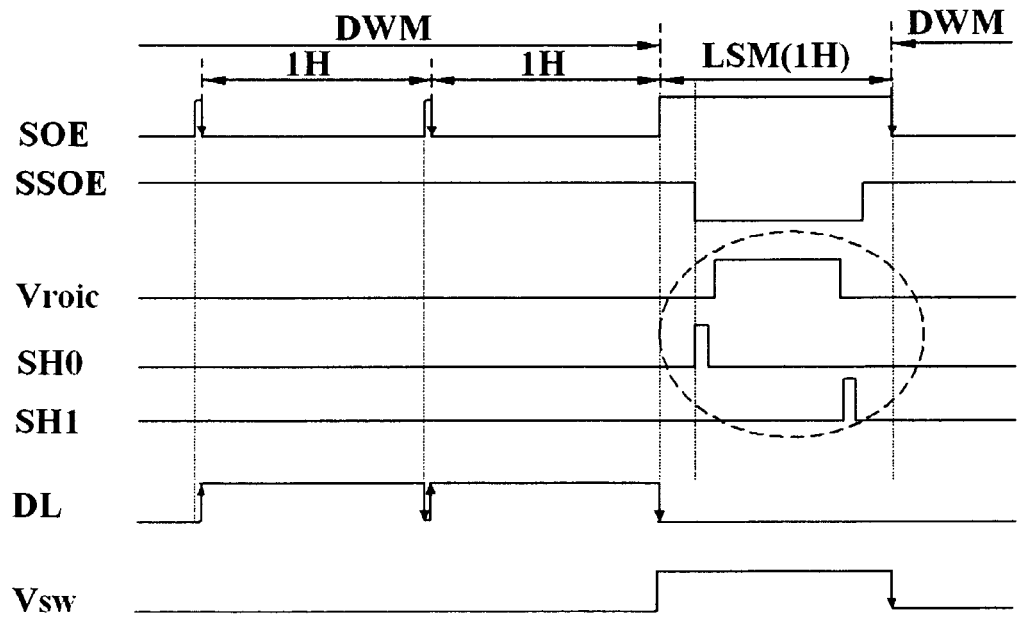
FIG. 5 is a waveform diagram showing signals applied to the LCD device of FIG. 3.

Moreover, the timing controller 104 allows the data drive circuit 106, the gate drive circuit 108, the sense processor 110, and the switch unit 114 to be driven in one of the data write mode and the light sense mode. To this end, the timing controller 104 enables the source output enable signal SOE to have a waveform as shown in FIG. 5. The source output enable signal SOE has a second voltage level enabling the data drive circuit 106 to output the pixel voltage signal to the data line DL during each source output enable period (corresponding to the scanning period of the horizontal synchronous signal Hsync) between a first voltage level of impulses, if the data write mode DSM is designated. On the other hand, when the light sense mode (a mode of sensing an external brightness and/or a touch of the liquid crystal panel 102 with a subject) LSM is designated, the source output enable signal SOE maintains a first voltage level during one horizontal synchronous signal period so that the switch unit 114 applies the switch voltage Vsw the data lines DL on the liquid crystal panel 102 instead of the pixel voltage signals. And then, the sense processor 110 responds to read-out control signals (for example, a sense output enable signal SSOE and first and second sampling clocks) from the timing controller 104 and outputs the sensed signal from the sense unit 112 to the timing controller 104.

The switch unit 114 connected between the liquid crystal panel 102 and the data drive circuit 106 responds to the source output enable signal SOE and selectively applies the switch voltage Vsw and the pixel voltage signals to the data lines DL of the liquid crystal panel 102. More specifically, the switch unit 114 applies a received switching voltage Vsw from the power supply unit (not shown) to the data lines DL, instead of the pixel voltage signals from the data drive circuit 106, in the light sense mode (i.e., while the source output enable signal SOE is in the first voltage level (or, the high logic level) LSM. The switch voltage Vsw may be set to be equal to a reference voltage Vref applied to a differential amplifier 200 of the sense processor 110. On the other hand, the switch unit 114 supplies the data line DL of the liquid crystal panel 102 with the pixel voltage signals from the data drive circuit 106 instead of the switch voltage Vsw in the data write mode DWM.

Figure 4:
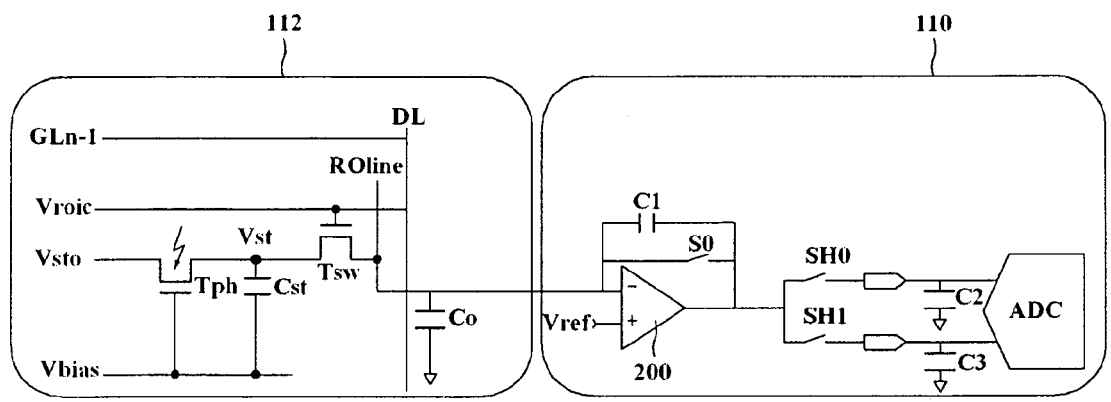
FIG. 4 is a detailed circuit diagram showing the sense processor and a sense unit of the liquid crystal panel in FIG. 3.

The sense unit 112 senses the external brightness and the touch of the liquid crystal panel 102 and applies a sensed signal to the sense processor 110. To this end, the sense unit 112 is configured to include a sense element Tph sensing the external brightness and/or the touch of the liquid crystal panel 102, a sensor drive voltage line transferring a drive voltage Vsto to the sense element Tph, a sensor bias voltage line transferring a bias voltage Vbias to the sense element Tph, a storage capacitor Cst storing the voltage of the sensed signal from the sense element Tph, a thin film transistor Tsw outputting the sensed signal which is charged in the storage capacitor Cst, a control signal line applying a control signal Vroic for the control of the thin film transistor Tsw and being parallel with the gate line GL, and a read-out line ROline transferring the sensed signal from the thin film transistor Tph to the sense processor 110, as shown in FIG. 4. Such a sense unit 112 may be formed at least one on the liquid crystal panel 102 in opposition to at least one pixel region.

The sense element Tph includes a drain electrode connected to the sensor drive voltage line, and source and gate electrodes each connected to a charge node and the sensor bias voltage line. Such a sense element Tph responds to lights incident from the exterior, and controls the drive voltage Vsto to be applied from the sensor drive voltage line to the charge node, thereby generating the sensed signal Vst at the charge node. The sensed signal has a voltage level which is varied along an amount of lights incident upon the sense element Tph.

The storage capacitor Cst between the charge node and the sensor bias line Vbias charges the passed drive voltage Vsto through the sense element Vph. In other words, the storage capacitor Cst charges a conductive current which flows toward the charge node through the sense element Tph and corresponds to an amount of the lights incident from the exterior, thereby temporarily storing the sensed signal Vst.

The thin film transistor Tsw includes source and drain electrodes connected to the charge node and the read-out line ROline, respectively, and a gate electrode connected to the control signal line. Such a thin film transistor Tsw outputs the voltage (i.e., the sensed signal) Vst charged in the storage capacitor Cst to the exterior through the read-out line ROline when the control signal Vroic is applied to its gate electrode through the control signal line.

The control signal line is formed in parallel with the gate line GL. The control signal Vroic on such a control signal line is enabled to turn on the thin film transistor Tsw during a part of the scan period of the horizontal synchronous signal Hsync. Then, the control signal Vroic maintains the first voltage level (for example, the high logic level), as shown in FIG. 5. Such a control signal may be derived from the scan pulse being applied to an adjacent gate line (for example, a preceding gate line GLn−1). For an example, the scan pulse on the adjacent gate line GL (i.e., the preceding gate line GLn−1) is delayed by the period of one horizontal synchronous signal Hsync, thereby generating the control signal Vroic.

The read-out line ROline receives the switch voltage Vsw from the power supply unit positioned in the external of the liquid crystal panel 102 or is simultaneously precharged with the switch voltage Vsw from the switch unit 114, together with the data line DL, during the light sense mode LSM. Preferably, the read-out line ROline may be simultaneously precharged with the switch voltage Vsw from the switch unit 114 together with the data line DL, during the light sense mode LSM. The precharged switch voltage Vsw on the read-out line ROline and the data line DL suppresses the generation of cross-talk and noise being caused by the parasitic capacitance existing between the read-out line ROline and the data line DL. As a result, the perception ratio and accuracy of the sense element Tph are improved.

The sense processor 110 processes the sensed signal Vst from the read-out line ROline. To this end, the sense processor 110 is configured to include an amplifier amplifying the signal on the read-out line ROline, first and second samplers sampling an output signal of the amplifier, and an analog-to-digital converter ADC receiving output signals of the samplers.

The amplifier includes a differential amplifier 200 receiving the signal on the read-out line ROline, and first capacitor C1 and first control switch S0 connected in parallel between the read-out line ROline and an output terminal of the differential amplifier 200. The differential amplifier 200 may consist of a commercially operational amplifier. Also, the differential amplifier 200 includes an invert terminal (−) connected to the read-out line ROline and a non-invert terminal (+) receiving the reference voltage Vref from the power supply unit. Such a differential amplifier 200 amplifies a different voltage between the reference voltage Vref and the signal on the read-out line ROline and applies the differentially amplified signal to the first and second samplers. Herein, the reference voltage Vref is set in the same voltage level as the switch voltage Vsw which is applied to the data line DL by the switching of the switch unit 114 during the light sense mode LSM.

The first capacitor C1 determines an amplification ratio of the differential amplifier 200 and a frequency band of the signal to be amplified by the differential amplifier 200. To this end, the first capacitor C1 is set in a capacitance value to adequately filter the signal on the read-out line ROline.

The first control switch S0 is turned on when a sense signal output enable signal SSOE from the timing controller 104 has the first voltage level (for example, the high logic level) as shown in FIG. 5, so that the differential amplifier 200 is in an idle state. On the other hand, the first control switch S0 is turned off while the sense signal output enable signal SSOE goes with the second voltage level (i.e., the low logic level), thereby amplifying the signal on the read-out line ROline by means of the differential amplifier 200.

The first sampler samples a normal state (or a precharged state) signal of the read-out line ROline. To this end, the first sampler includes a second control switch SH0 connected between the output terminal of the differential amplifier 200 and a first input terminal of the analog-to-digital converter ADC, and a second capacitor C2 connected to the first input terminal of the analog-to-digital converter ADC. The second control switch SH0 responds to the first voltage level (i.e., the high logic level) of a first sampling control pulse which is applied from the timing controller 104 and cited as "SH0" in FIG. 5. In accordance therewith, the second control switch SH0 is turned-on during the period between the turning-off point of the first control switch S0 and the turning-on point of the thin film transistor Tsw and applies the output signal of the differential amplifier 200 to the second capacitor C2 and the first input terminal of the analog-to-digital converter ADC, thereby sampling the normal state (or the precharged state) signal of the read-out line ROline. The normal state (or the precharged state) signal includes cross-talk and noise components (i.e., error components) which are caused by the parasitic capacitance between the read-out line ROline and the data line DL. The second capacitor C2 temporarily stores the sampled moral state (or precharged state) signal from the second control switch SH0.

The second sampler samples the sensed signal Vst generated in the sense element Tph. To this end, the second sampler includes a third control switch SH1 connected between the output terminal of the differential amplifier 200 and a second input terminal of the analog-to-digital converter ADC, and a third capacitor C3 connected to the second input terminal of the analog-to-digital converter ADC. The third control switch SH1 responds to the first voltage level (i.e., the high logic level) of a second sampling control pulse which is applied from the timing controller 104 and cited as "SH1" in FIG. 5, and samples the sensed signal Vst. More specifically, the third control switch SH1 is turned-on during the period between the turning-off point of the thin film transistor Tsw and the turning-on point of the first control switch S0, and applies the output signal of the differential amplifier 200 to the third capacitor C3 and the second input terminal of the analog-to-digital converter ADC, thereby sampling the sensed signal, which has been generated in the sense element Tph, on the read-out line ROline. In the sampled sense signal, it may be included the normal state (or the precharged state) signal (i.e., the cross-talk and noise components). The third capacitor C3 temporarily stores the sampled sense signal from the third control switch SH1.

The analog-to-digital converter ADC converts the output signals of the first and second samplers in the shape of digital signals and applies the digital signals to the timing controller 104. In detail, the analog-to-digital converter ADC converts the normal state (or the precharged state) signal at the second capacitor C2 and the sensed signal Vst at the third capacitor C3 in the digital signal shape and supplies the digital normal state (or the precharged state) signal and the digital sense signal to the timing controller 104. The digital normal state (or the precharged state) signal indicates the amount of the cross-talk and noise included in the digital sensed signal and enables the timing controller 104 to more accurately identify the external brightness and/or the touch of the liquid crystal panel 102 on the basis of the digital sense signal. Accordingly, the perception ratio and accuracy of the sense element Tph are improved more.

Such an LCD device forces the source output enable signal to maintain the first voltage level, the voltage equal to the reference voltage of the sense processor to be applied to the data line, and the gate signal to be applied to the gate electrode of the thin film transistor, during the light sense mode LSM, thereby outputting the sensing signal which is sensed by the sense element. In accordance therewith, the parasitic capacitance between the data line and the read-out line does not have influence on the sensed signal. As a result, the perception ratio and the accuracy of the sense element are improved.

As described above, the LCD device according to the present embodiment allows the sensed signal by the sense element to be output through the read-out line which is precharged with the switch voltage Vsw together with the data line, thereby suppressing the generation of cross-talk and noise due to the parasitic capacitance existing therebetween. Accordingly, the LCD device improves the perception ratio and accuracy of the sense element Tph.

Moreover, the LCD device according to the present embodiment provides a normal state signal indicating the amount of the cross-talk and noise which are included in the signal sensed by the sense element. Accordingly, the LCD device should more accurately identify the external brightness and/or the touch of the liquid crystal panel on the basis of the digital sensed signal. As a result, the LCD device improves more the perception ratio and accuracy of the sense element.

It will be apparent to those skilled in the art that various modifications and variations can be made in the present invention. Thus, it is intended that the present invention cover the modifications and variations of this invention provided they come within the scope of the appended claims and their equivalents.

What is claimed is:

1. A liquid crystal display device comprising:
   a liquid crystal panel including a plurality of pixels connected to gate lines and data lines thereon, respectively;
   a gate drive circuit applying scan signals to the gate lines;
   a data drive circuit applying pixel voltage signals to the data lines;
   at least one sensor unit formed in at least one pixel region and sensing external lights and a touch of the liquid crystal panel;
   a switch unit switching a switch voltage and the pixel voltage signals to be applied to the data lines on the liquid crystal panel;
   a sense processor processing the sensed signal from the sensor unit; and
   a timing controller controlling the gate drive circuit, the data drive circuit, the switch unit, and the sense processor to be driven in one of data write mode and light sense mode,
   wherein the sense unit includes a sense element sensing the external lights and the touch of the liquid crystal panel; a read-out line transferring the sensed signal from the sense element to the sense processor; and a thin film transistor, responsive to a control signal, switching the sensed signal to be applied from the sense element to the read-out line,
   wherein the read-out line and the data line are simultaneously precharged with the switch voltage during the light sense mode.

2. The liquid crystal display device claimed as claim 1, wherein the control signal is derived from the scan pulse being applied to the gate line.

3. The liquid crystal display device claimed as claim 1, the sense unit further includes a storage capacitor storing the sensed signal to be applied from the sense element to the thin film transistor.

4. The liquid crystal display device claimed as claim 1, wherein the sense element uses a drive voltage having a level different from the switch voltage.

5. The liquid crystal display device claimed as claim 1, wherein the sense processor is configured to include a sampler sampling the signal on the read-out line upon the control of the timing controller.

6. The liquid crystal display device claimed as claim 5, wherein the sense processor further includes an analog-to-digital converter converting the sampled signal by the sampler into a digital signal.

7. The liquid crystal display device claimed as claim 5, wherein the sense processor further includes an amplifier the signal being applied from the read-out line to the sampler.

8. The liquid crystal display device claimed as claim 7, wherein the amplifier differentially amplifies the signal on the read-out line with a reference voltage.

9. The liquid crystal display device claimed as claim 8, wherein the switch unit supplies the data lines of the liquid crystal panel with the switch voltage equal to the reference voltage in the light sense mode.

10. The liquid crystal display device claimed as claim 8, wherein the sense processor further includes:
    a capacitor connected between the read-out line and an output terminal of the amplifier; and
    a switch connected in parallel with the feedback capacitor.

11. The liquid crystal display device claimed as claim 10, wherein the switch is turned-off during the light sense mode.

12. The liquid crystal display device claimed as claim 8, wherein the sense processor further includes an auxiliary sampler sampling a normal state signal of the read-out line from the output terminal of the amplifier, upon the control of the timing controller.

13. The liquid crystal display device claimed as claim 12, wherein the normal state signal includes cross-talk and noise components caused by a parasitic capacitance between the read-out line and the data line.

* * * * *